April 24, 1934. G. W. BOOTH 1,956,211
METHOD OF CAPPING CONTAINERS AND PRODUCT THEREOF
Original Filed June 7, 1932 3 Sheets-Sheet 1
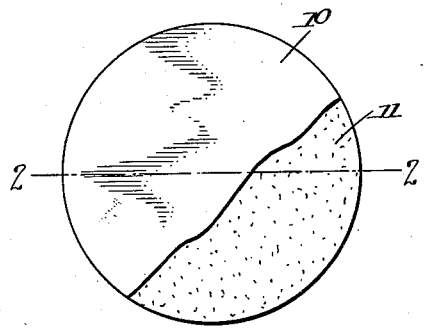
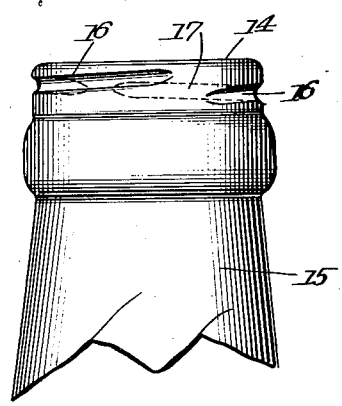
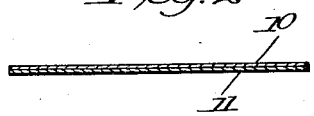
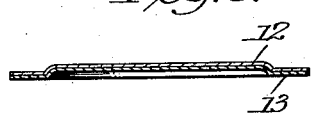
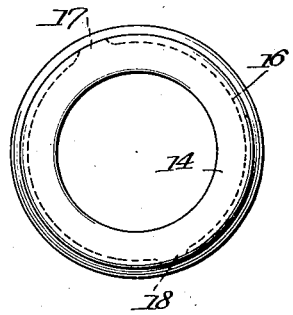
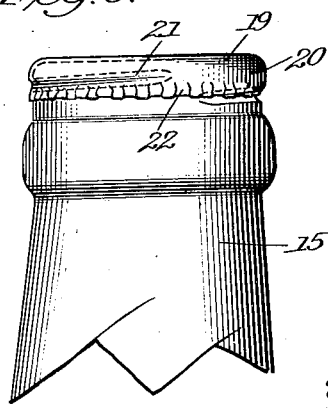
Inventor
George W. Booth April 24, 1934.  G. W. BOOTH  1,956,211
METHOD OF CAPPING CONTAINERS AND PRODUCT THEREOF
Original Filed June 7, 1932    3 Sheets-Sheet 2
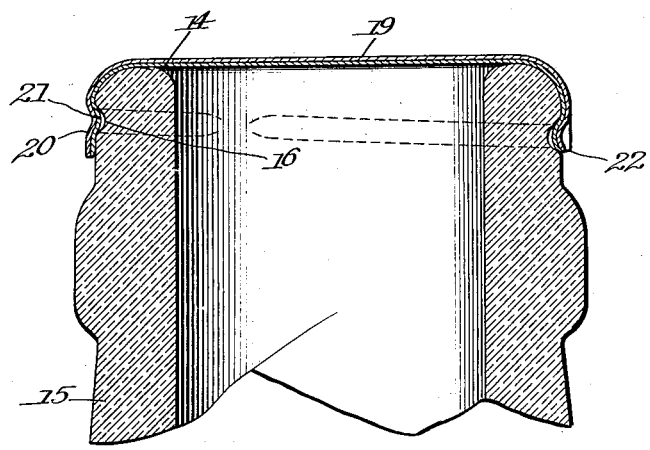
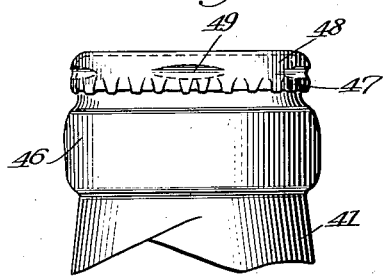
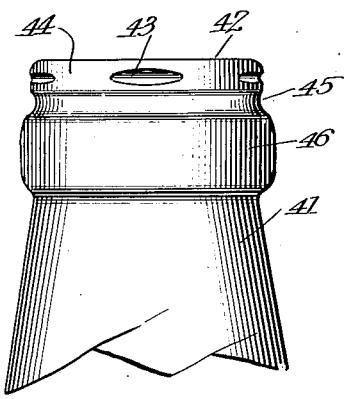
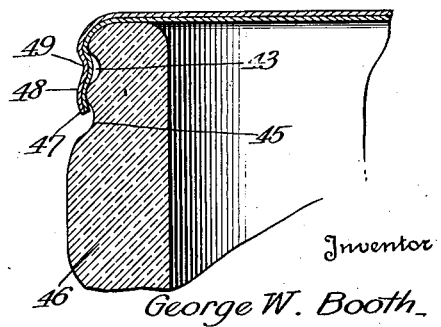
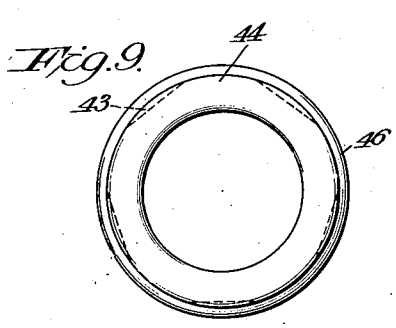
Inventor
George W. Booth

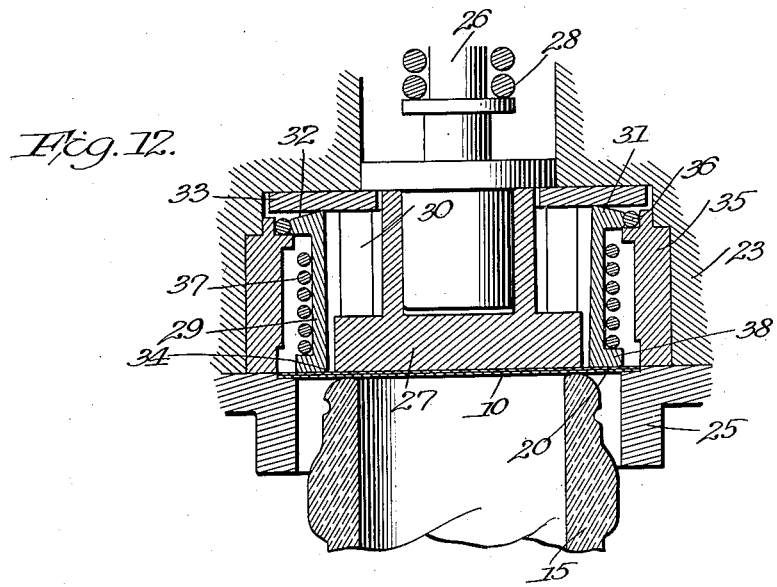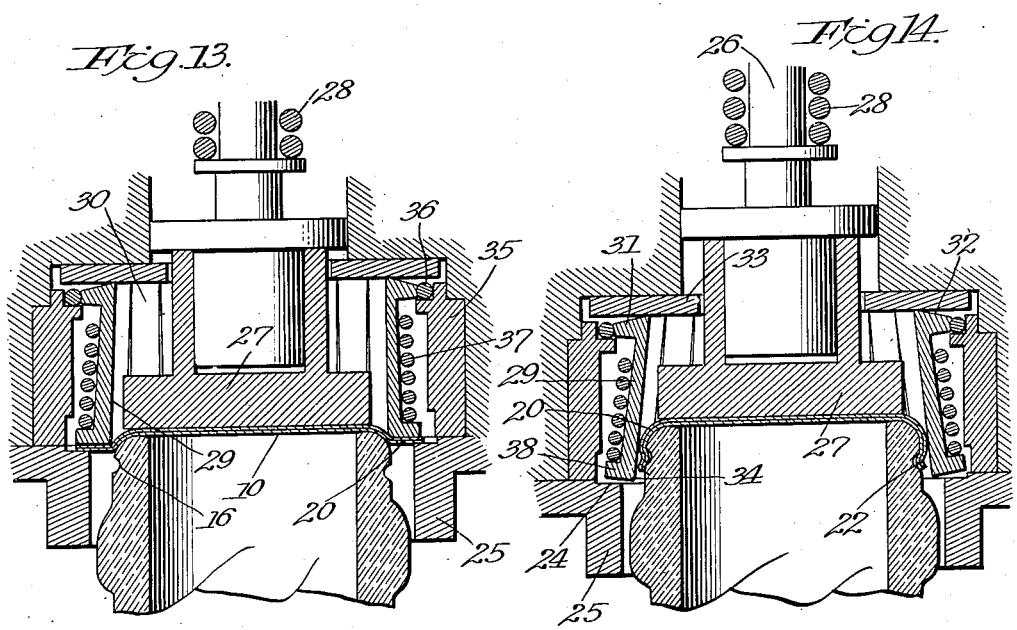

Patented Apr. 24, 1934

1,956,211

UNITED STATES PATENT OFFICE 1,956,211

METHOD OF CAPPING CONTAINERS AND PRODUCT THEREOF

George W. Booth, Baltimore, Md., assignor to Crown Cork & Seal Company, Inc., Baltimore, Md., a corporation of New York Application June 7, 1932, Serial No. 615,916
Renewed January 17, 1934

18 Claims. (Cl. 226—83)

The present invention relates to an improved method of applying closures to containers and to the product thereof. More particularly the invention relates to a modification of the method and product of my co-pending application Serial No. 615,915, filed June 7, 1932, and of the invention of my co-pending application Serial No. 553,464, filed July 27, 1931.

An object of the invention is to provide a method for applying to a container having one or more circumferentially extending interrupted grooves, a cap formed with one or more ribs complementary to the groove or grooves, the method involving the formation of the cap upon the container in situ. I am aware that it is broadly old to provide a container having circumferentially interrupted grooves with a cap formed with ribs complementary to the grooves, so that upon relative movement of the cap and container, the ribs are pressed outwardly and the removal of the cap thereby permitted. An example of such a construction is disclosed in the patent to Dunnock, No. 1,494,673, granted May 20, 1924.

The present invention constitutes an improvement in container closures of this general character and relates to an improved method of producing the same.

An object of the invention is to provide a method of applying to a container having one or more circumferentially interrupted grooves, a closure formed with one or more ribs complementary to the groove or grooves, such ribs closely fitting the groove or grooves and corresponding thereto in shape and extent.

A still further object of the invention consists in providing a new and improved method of applying a closure of the type described and forming the same from ductile material in such a way that when the ribs are distorted by relative movement of the cap and container, they tend to spring back into position sufficiently to permit re-application of the cap, although the initial removal thereof from the container will be evident upon inspection.

The foregoing and other objects and features of the invention will become clearer as the description proceeds in connection with certain preferred embodiments disclosed in the accompanying drawings, wherein:

Figure 1 is a plan view of a closure of a type adapted to be utilized in practicing the method.

Figure 2 is a cross sectional view on substantially the line 2—2 of Figure 1.

Figure 3 is a cross sectional view, corresponding to Figure 2, of a modified form of closure.

Figure 4 is a side elevational view of the upper portion of a container of the type comprehended within the present invention.

Figure 5 is a top plan view of the container shown in Figure 4.

Figure 6 is a view similar to Figure 4 with the cap applied.

Figure 7 is a cross sectional view of the container and cap shown in Figure 6.

Figure 8 is a side elevational view, similar to Figure 4, of a modified form.

Figure 9 is a top plan view of the construction shown in Figure 8.

Figure 10 is a view similar to Figure 8 with the cap applied.

Figure 11 is a fragmentary sectional view of the container and cap shown in Figure 10.

Figure 12 is a sectional view showing the initial step in applying a closure to a container in accordance with the method of the invention.

Figure 13 illustrates an intermediate step in the application of the closure, and Figure 14 shows the final step in the application of the closure.

Referring to the drawings, the closure 10 (Figure 1) is preferably made of thin ductile material, such as sheet metal, and the same may, if desired, have associated therewith a facing 11 of paper or other fiber composition, such as cellophane. Instead of utilizing a flat disk, there may be used a disk such as shown in Figure 3, provided with a centrally depressed portion 12, the entire disk being faced, if desired, with fibrous material 13. It will be understood that the depressed portion serves to center the disk upon the container when it is to be applied thereto in accordance with the method hereinafter described. In fact, any of the forms of caps shown in my co-pending applications above referred to may be utilized, and it will be understood that the facing 13 is intended to provide an impervious and non-corrosive surface to contact with the lip 14 of the container 15. Accordingly, it may be formed from parchment, rubber compound, cork composition, or any material suitably resistant to the contents to be capped.

The container 15 is provided around its mouth and adjacent the lip 14 with one or more circumferentially extending grooves 16, two (2) groves being illustrated in the form shown in Figures 4, 5, and 6. These grooves are preferably inclined so as to have a lifting effect when the applied cap is rotated relative to the container in one direction and to exert a sealing force when the cap is rotated in the other direction. These grooves are interrupted circumferentially by interrupting portions 17, 18 into which the groove merge. These interrupting portions are preferably flush with the edge of the container around the lip 14, so that when the ribs of a cap are pressed outwardly upon rotation thereof, the cap may be freely lifted from the container.

Referring to Figure 6, the applied cap 19, which is formed in accordance with the method hereinafter described from a disk of the type shown in Figure 1 or 3, has a depending portion or skirt 20 which closely fits over the lip 14 to provide an extended sealing surface, both circumferentially and axially. This skirt is formed with inwardly pressed circumferentially extending ribs 21 which fit into the complementary grooves 16, thereby locking the cap upon the container with the skirt and top portion of the cap in sealing engagement with the lip 14. Below the groove 16 the cap is formed with a freely buckled margin or edge 22, and this edge consists of a multiplicity of irregular corrugations resulting from the natural or free buckling of the ductile material when the cap is applied in accordance with the method of the present invention. The freely buckled portion produces a slight frictional engagement with the neck somewhat below the ribs, but does not prevent rotation of the cap.

Referring to the method of application illustrated in Figures 12 to 14, the cap or closure, in blank form, is positioned over the mouth of the bottle 15 and is fed thereto by a suitable capping machine 23, which has a ledge 24 formed in a guide or annulus 25 that supports the marginal portion 20 of the cap. A spindle 26 reciprocably mounted in the capping machine has operatively connected thereto a presser tool 27 which is slightly larger than the inner diameter of the mouth 14 of the bottle and is arranged to bear yieldably against the blank disk 10 through the instrumentality of the spring 28 to insure proper centering of the closure disk upon the container and a close contact between the under surface of the container and the top surface or perimeter of the bottle mouth.

While the intermediate portion of the disk 10, that is to say, the surface between the mouth 14 of the bottle, is maintained in firm engagement therewith by the presser tool 27, that portion of the disk between the margin 20 and the presser tool 27 is arranged to be uniformly drawn downwardly and ironed over the curved surface of the lip in the manner as clearly illustrated in Figure 13. During this ironing operation, the marginal portion or edge 20 of the closure remains supported by the ledge 24, so as to insure a gradual or progressive deflection of the closure along the surface of the container mouth, as distinguished from a bodily bending of the same from the point of initial application or pressure outwardly to its edge.

This ironing and drawing of the metal to form the closure skirt is preferably accomplished by means of a bending throat 29 formed of a plurality of segmental strip 30, which surround the pressure tool 27. Each of the segmental strips 30 has at its upper end an outwardly directed flange 31 formed with a bevelled surface 32 which is arranged to bear against a follower plate 33. Relative movement of the plate 33 and container 15 towards each other acts to force the lower edge 34 of each segment against the adjacent surface of the closure 10, so as to draw the metal thereof downwardly and iron the same over the surface of the mouth to cause the metal to flow into the spaced grooves 16 and snugly engage the adjacent smooth surface of the neck. That portion of the skirt 20 which flows into the grooves 16 forms the ribs 21, which coact with the smooth surface of the skirt to insure a tamper-proof connection of the closure with the container and prevent the removal of the closure only when sufficient turning pressure is applied to force the ribs out of the groove and into engagement with their smooth surface of the skirt which presses or forces the ribs outwardly, thus effecting removal of the closure from the container.

The segments 30 are collectively supported at their upper ends within a tubular housing 35 by means of a ring 36 against which the outer edge of the flange 31 engaged to constitute a fulcrum bearing, which permits the independent movement of the segments in order that they may readily conform to any irregularity or variation in diameters of the container mouths or necks. A coil spring 37 surrounds the segments 30 and is confined between the end flanges 31 and 38 to yieldably hold the segments in contacting engagement with each other, while permitting relative movement between the segments when they encounter resistance during the operation of applying the closure to the container.

The segments 30 have a slight longitudinal taper and longitudinal flat inner surfaces, so that the diameter of the throat 29 is less at its lower end 34 than at its upper end. This variation in diameters reduces the contact between the inner surface of the segments and the cap 10, with the result that substantially the entire ironing action is produced by the lower edge 34.

When the presser tool 29 is yieldably maintained against the closure cap 10 and the marginal portion 20 of the cap is supported by the ledge 24, relative movement between the container 15 and the bending throat 29 may be effected either by moving the container upwardly or moving the throat downwardly, such movement being permitted due to the yielding of the spring 28, which allows the presser tool to move upwardly within the throat 29.

The final position of the closure when applied by the capping machine to the container is shown in Figure 14, and it will be understood that relative movement between the throat 29 and the closure 10 results in the progressive ironing and drawing of the metal of the closure outwardly and downwardly toward the edge of the closure until the free marginal portion thereof is disengaged from the ledge 24 and distorted to form the skirt 20. Under this drawing and ironing action, the marginal portion of the skirt automatically buckles to form the corrugations 22, which yieldably press against the adjacent surface of the container.

It will be observed from Figure 14 that the corrugations or crimps 22 formed by this buckling action are, at all times, free from engagement with the throat 29, which is spaced therefrom at its lower edge 34. In other words, the inner surface of the throat 29 contacts only with the upper and intermediate portions of the skirt 20. Consequently, the marginal portion of the cap buckles against the adjacent surface of the finish of the container simply by reason of the bending and drawing pressure applied around the container mouth and inwardly therefrom by the throat 29. This ironing and bending pressure automatically produces a buckling of the free edge of the marginal portion of the closure without engagement of the throat 29 therewith.

Obviously, the closure may vary as to size and shape, so as to be applied to containers such as milk bottles or the like, of different sizes. As the skirt 20 is formed and applied to the container by uniform ironing and bending pressure, it will insure the provision of a sealing engagement of maximum area over the mouth and neck of the container and will readily conform itself to any irregularities in the shape of the container.

In producing the cap there is preferably utilized a ductile material which will permit the ribs to return after the cap is rotated. That is to say, the ribs are not obliterated upon removal of the cap, but return, thereby permitting re-application of the cap to the container.

Instead of using a groove formation of the character shown in Figures 4 and 5, there may be provided a construction of the character shown in Figures 8 to 11, inclusive.

Referring to these views, the container 41 is provided with a mouth 42, and around the mouth are arranged a series of circumferentially extending grooves 43 which merge into smooth portions 44 substantially flush with the edge of the container around the mouth 42. The grooves 43 are not inclined and constitute means for locking a cap in position when applied in accordance with the method illustrated in Figures 12 to 14, inclusive, and hereinbefore described. Beneath the portion of the neck formed with the grooves 43 there may be provided a continuous and uninterrupted groove 45 disposed immediately above a circumferential rib 46. The groove 45 serves to receive the crimped marginal portion or edge 47 of the skirt 48 (Figure 10), and, as will be observed, the skirt, when applied in accordance with the method described, has a series of inwardly pressed ribs 49 of substantially the same formation as the grooves 43. The freely buckled edge 47 extends slightly into the groove 45, as indicated clearly in Figure 11, and tends to resist upward movement of the cap, but does not prevent the same. It also provides a portion which may be engaged and held without slipping of the hand when rotation of the cap is desired for the purpose of pressing outwardly the ribs 49 by rotation of the cap. When the cap has been rotated to bring the ribs 49 over the interrupting portions 44, the ribs are pressed outwardly and the cap may be freely lifted. Thereafter, due to the spring action of the metal, the ribs return, and although removal of the cap may be detected by inspection thereof, it may be re-applied, since the ribs are not obliterated. Obviously, the invention is not limited to the details herein described, and such modifications may be made therein, without departing from the invention, as come within the scope of the following claims.

I claim:

1. The improved method of capping a container having a circumferentially interrupted groove formed externally in the neck which consists in positioning over the mouth of the container a closure blank of ductile material and of larger area than the container mouth, and ironing the closure over the container neck sufficiently to cause the ductile material to flow into the groove and form a retaining rib complementary to the groove, whereby the cap may be removed by turning the same relative to the container so as to cause the rib to ride out of the groove into engagement with the groove interrupting portions of the neck and be pressed outwardly thereby.

2. The improved method of capping a container having a circumferentially interrupted inclined groove formed externally in the neck which consists in positioning over the mouth of the container a closure blank of ductile material and of larger area than the container mouth, and ironing the closure over the container neck sufficiently to cause the ductile material to flow into the groove and form a retaining rib complementary to the groove, whereby the cap may be removed by turning the same relative to the container so as to cause the rib to ride out of the groove into engagement with the groove interrupting portions of the neck and be pressed outwardly thereby.

3. The improved method of capping a container having a circumferentially interrupted groove formed externally in the neck thereof which consists in positioning over the mouth of the container a closure mouth of ductile material and of larger diameter than the container mouth, and ironing the closure over the container neck by applying pressure outwardly and downwardly sufficiently to cause the ductile material to flow into the interrupted groove and form a retaining rib complementary thereto, whereby the closure may be removed by turning the same relative to the container so as to cause the rib to engage and be pressed outwardly by the groove interrupting portion of the neck.

4. The improved method of capping a container having a circumferentially interrupted inclined groove formed externally in the neck thereof which consists in positioning over the mouth of the container a closure mouth of ductile material and of larger diameter than the container mouth, and ironing the closure over the container neck by applying pressure outwardly and downwardly sufficiently to cause the ductile material to flow into the interrupted groove and form a retaining rib complementary thereto, whereby the closure may be removed by turning the same relative to the container so as to cause the rib to engage and be pressed outwardly by the groove interrupting portion of the neck.

5. A new and improved method of capping a container having an external interrupted groove formed around the mouth thereof which consists in positioning over the mouth a closure blank of ductile material and of larger diameter than the container mouth and ironing the closure over the container neck by applying pressure beginning inwardly from the edge of the closure and extending outwardly and downwardly around the container mouth and sufficiently to cause the ductile material to flow into the groove and form an interrupted rib so that upon relative movement the rib is moved into engagement and pressed outwardly by the groove interrupting portion of the neck to permit removal of the closure from the container.

6. A new and improved method of capping a container having an external interrupted inclined groove formed around the mouth thereof which consists in positioning over the mouth a closure blank of ductile material and of larger diameter than the container mouth and ironing the closure over the container neck by applying pressure beginning inwardly from the edge of the closure and extending outwardly and downwardly around the container mouth and sufficiently to cause the ductile material to flow into the groove and form an interrupted rib so that upon relative movement the rib is moved into engagement and pressed outwardly by the groove interrupting portion of the neck to permit removal of the closure from the container.

7. A new and improved method of capping a container having an interrupted groove formed around the mouth thereof which consists in positioning over the mouth a closure blank of ductile material and of larger diameter than the container mouth and applying pressure inwardly from the edge of the closure uniformly around the container mouth and progressively continuing the same outwardly and downwardly sufficiently to cause the ductile material adjacent the groove to flow therein and form a complementary interrupted rib, and to buckle along the closure edge, whereby upon relative turning movement the rib is moved out of the groove and engages the interrupting surface of the neck and pressed outwardly thereby to permit the removal of the closure from the container.

8. A new and improved method of capping a container having an interrupted spiral groove formed around the mouth thereof which consists in positioning over the mouth a closure blank of ductile material and of larger diameter than the container mouth and applying pressure inwardly from the edge of the closure uniformly around the container mouth and progressively continuing the same outwardly and downwardly sufficiently to cause the ductile material adjacent the groove to flow therein and form a complementary interrupted rib, and to buckle along the closure edge, whereby upon relative turning movement the rib is moved out of the groove and engages the interrupting surface of the neck and pressed outwardly thereby to permit the removal of the closure from the container.

9. The method of applying a removable closure to a container having circumferentially incomplete grooves externally formed in the neck thereof which consists in positioning over the mouth a closure blank of ductile material and of larger diameter than the container mouth, applying pressure inwardly from the edge of the closure uniformly around the container mouth and progressively continuing the same outwardly and downwardly sufficiently to cause the ductile material to flow into the spaced grooves and form ribs complementary thereto, and the lower edge of the skirt to buckle into yielding engagement with the neck, whereby the closure may be removed by turning the same relative to the container so as to bring the ribs into engagement with the groove interrupting surface of the neck.

10. An improved method of capping a container having an interrupted spiral groove formed externally around the mouth thereof and an annular recess beneath said groove, which consists in positioning over the mouth a closure of ductile material of larger area than the container mouth, supporting the closure along its edge, and while supporting its edge applying inwardly therefrom over the container lip an ironing pressure sufficient to distort the ductile material to conform to the lip, progressively continuing the ironing pressure outwardly toward the edge over the container lip sufficiently to cause the supported edge portion to be disengaged from its support and to flow into the spiral groove to form a complementary interrupted rib whereby upon turning of the closure relative to the container to move the rib into engagement with the interrupting surface of the neck and permit the removal of the closure from the container.

11. An improved method of capping a container having an interrupted inclined groove formed externally around the mouth thereof and an annular recess beneath said groove, which consists in positioning over the mouth a closure of ductile material of larger area than the container mouth, supporting the closure along its edge, and while supporting its edge applying inwardly therefrom over the container lip an ironing pressure sufficient to distort the ductile material to conform to the lip, progressively continuing the ironing pressure outwardly toward the edge over the container lip sufficiently to cause the supported edge portion to be disengaged from its support and to flow into the spiral groove to form a complementary interrupted rib whereby upon turning of the closure relative to the container to move the rib into engagement with the interrupting surface of the neck and permit the removal of the closure from the container.

12. The improved method of capping a container having an interrupted groove formed externally in the neck thereof, which consists in positioning over the mouth a closure blank of ductile material and of larger area than the container mouth, supporting the closure along its edge, and while supporting its edge applying inwardly therefrom over the container lip an ironing pressure sufficient to distort the ductile material to conform to the lip, progressively continuing the ironing pressure outwardly toward the edge over the container lip sufficiently to cause the supported edge portion to be disengaged from its support and to flow into the groove and form a retaining rib in said groove and the margin of the closure to buckle against the container whereby upon turning movement the rib on the closure is brought into engagement and pressed outwardly by the interrupting surface of the neck to permit the removal of the closure from the container.

13. The improved method of capping a container having an interrupted inclined groove formed externally in the neck thereof, which consists in positioning over the mouth a closure blank of ductile material and of larger area than the container mouth, supporting the closure along its edge, and while supporting its edge applying inwardly therefrom over the container lip an ironing pressure sufficient to distort the ductile material to conform to the lip, progressively continuing the ironing pressure outwardly toward the edge over the container lip sufficiently to cause the supported edge portion to be disengaged from its support and to flow into the groove and form a retaining rib in said groove and the margin of the closure to buckle against the container whereby upon turning movement the rib on the closure is brought into engagement and pressed outwardly by the interrupting surface of the neck to permit the removal of the closure from the container.

14. The improved method of applying a removable cap to a container having circumferentially incomplete grooves externally formed in the neck thereof which consists in positioning over the mouth a closure blank formed of ductile material, said blank being of larger area than the container mouth, applying pressure to the closure inwardly from its edge to effect a sealing engagement with the container lip and simultaneously supporting the free edge of the closure and ironing the closure over the container lip by direct application of pressure over the lip and continuing the ironing pressure outwardly and downwardly over the lip toward the edge of the closure sufficiently to cause the ductile material to flow into the grooves and form complementary ribs, and the edge to buckle against the container whereby the closure may be removed upon turning the same relative to the container so as to force the ribs into engagement with the interrupting surfaces of the neck.

15. In combination with a container having an external interrupted groove around its neck, a cap of ductile material having a top portion over the container mouth and a depending skirt portion provided with a complementary interrupted rib formed in the capping operation and engaging said groove, the marginal portion of the skirt being buckled and yieldably maintained in engagement with the adjacent surface of the neck, whereby upon relative movement the rib is moved out of engagement with the groove and into engagement with the interrupting surface of the neck and forced outwardly thereby to permit the removal of the closure from the container.

16 In combination with a container having an external interrupted inclined groove around its neck, a cap of ductile material having a top portion over the container mouth and a depending skirt portion provided with a complementary interrupted spiral rib ironed into said groove in the capping operation, the marginal portion of the skirt being buckled, whereby upon relative movement the rib is moved out of engagement with the groove and into engagement with the interrupting surface of the neck and forced outwardly thereby to permit the removal of the closure from the container.

17. In combination with a container having formed externally in the neck thereof grooves merging into interrupting portions, a cap of ductile material having a top portion over the container mouth and a depending skirt portion provided with complementary ribs ironed into said grooves in the capping operation, said cap making a sealing contact with the mouth of the container, whereby upon relative movement the ribs are moved out of engagement with their complementary grooves and into engagement with the interrupting portions of the neck and forced outwardly thereby to permit the removal of the closure from the container.

18. In combination with a container having formed externally in the neck thereof inclined grooves merging into interrupting portions, a cap of ductile material having a top portion over the container mouth and a depending skirt portion provided with complementary ribs ironed into said grooves in the capping operation, said cap making a sealing contact with the mouth of the container, whereby upon relative movement the ribs are moved out of engagement with their complementary grooves and into engagement with the interrupting portions of the neck and forced outwardly thereby to permit the removal of the closure from the container.

GEORGE W. BOOTH.